United States Patent
Ma et al.

(10) Patent No.: US 11,250,854 B2
(45) Date of Patent: Feb. 15, 2022

(54) METHOD AND APPARATUS FOR VOICE INTERACTION, DEVICE AND COMPUTER-READABLE STORAGE MEDIUM

(71) Applicant: Baidu Online Network Technology (Beijing) Co., Ltd., Beijing (CN)

(72) Inventors: Xiaokong Ma, Beijing (CN); Ce Zhang, Beijing (CN); Jinfeng Bai, Beijing (CN); Lei Jia, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/894,960

(22) Filed: Jun. 8, 2020

(65) Prior Publication Data
US 2021/0158816 A1   May 27, 2021

(30) Foreign Application Priority Data
Nov. 25, 2019   (CN) .......................... 201911168794.1

(51) Int. Cl.
G10L 15/22   (2006.01)
G10L 15/06   (2013.01)
G10L 15/16   (2006.01)
G10L 15/18   (2013.01)
G10L 25/24   (2013.01)

(52) U.S. Cl.
CPC ............ G10L 15/22 (2013.01); G10L 15/063 (2013.01); G10L 15/16 (2013.01); G10L 15/1815 (2013.01); G10L 25/24 (2013.01)

(58) Field of Classification Search
None
See application file for complete search history.

(56) References Cited

U.S. PATENT DOCUMENTS

2007/0094022 A1   4/2007   Koo
2016/0284347 A1*  9/2016   Sainath ................ G06N 3/0454
(Continued)

FOREIGN PATENT DOCUMENTS

CN   106649694 A   5/2017
CN   107808004 A   3/2018
(Continued)

OTHER PUBLICATIONS

Imoto, K et al.; "Automated Defect Classification System for Semiconductor Manufacturing Processes Using Deep Learning"; Special Reports, vol. 74, No. 5, pp. 13-16; Sep. 2019; English abstract only (4 pages).

(Continued)

Primary Examiner — Quynh H Nguyen
(74) Attorney, Agent, or Firm — Nixon Peabody LLP (57) ABSTRACT

A method, apparatus, device, and storage medium for voice interaction. A specific embodiment of the method includes: extracting an acoustic feature from received voice data, the acoustic feature indicating a short-term amplitude spectrum characteristic of the voice data; applying the acoustic feature to a type recognition model to determine an intention type of the voice data, the intention type being one of an interaction intention type and a non-interaction intention type, and the type recognition model being constructed based on the acoustic feature of training voice data; and performing an interaction operation indicated by the voice data, based on determining that the intention type is the interaction intention type.

20 Claims, 7 Drawing Sheets

(56) References Cited

U.S. PATENT DOCUMENTS

| | | | |
|---|---|---|---|
| 2017/0092297 A1 | 3/2017 | Sainath | |
| 2017/0242478 A1* | 8/2017 | Ma | H04N 9/3147 |
| 2017/0243580 A1 | 8/2017 | Furumoto et al. | |
| 2018/0096690 A1 | 4/2018 | Mixter et al. | |
| 2018/0108351 A1* | 4/2018 | Beckhardt | G06F 3/165 |
| 2019/0372794 A1* | 12/2019 | Ocher | G10L 15/26 |
| 2020/0234717 A1 | 7/2020 | Zhao | |

FOREIGN PATENT DOCUMENTS

| | | | |
|---|---|---|---|
| CN | 108320733 | A | 7/2018 |
| CN | 108564954 | A | 9/2018 |
| CN | 108766440 | A | 11/2018 |
| CN | 109767759 | * | 2/2019 |
| CN | 109671435 | A | 4/2019 |
| CN | 109767759 | A | 5/2019 |
| CN | 110166391 | A | 8/2019 |
| CN | 110390108 | A | 10/2019 |
| JP | 2017194510 | A | 10/2017 |
| JP | 2018106216 | A | 7/2018 |
| JP | 2018169494 | A | 11/2018 |
| WO | 2016051519 | A1 | 4/2016 |

OTHER PUBLICATIONS

Z. Zhao et al.; "A lighten CNN-LSTM model for speaker verification on embedded devices"; Future Generation Computer Systems, vol. 100, pp. 751-758; 2019 (9 pages).

* cited by examiner

METHOD AND APPARATUS FOR VOICE INTERACTION, DEVICE AND COMPUTER-READABLE STORAGE MEDIUM

CROSS-REFERENCE TO RELATED APPLICATIONS

This application claims priority to Chinese Patent Application No. 201911168794.1, filed with the China National Intellectual Property Administration (CNIPA) on Nov. 25, 2019, the contents of which are incorporated herein by reference in their entirety.

TECHNICAL FIELD

Embodiments of the present disclosure relate to the field of voice processing, and more specifically to a method and apparatus for voice interaction, device and computer readable storage medium.

BACKGROUND

With the continuous development and improvement of Artificial Intelligence (AI) technology, voice interaction as an important branch in the field of artificial intelligence has gradually entered daily lives, and application scenarios for voice interaction gradually increase. Smart devices (such as mobile terminals, smart speakers, in-vehicle terminals, or smart home appliances) may recognize input voice data, and perform interaction operations based on recognition results.

In the process of interacting with smart devices, one expects to adopt the communication mode that is closer to natural language. Traditional solutions for voice interaction usually perform simple voice interaction based on pre-established strategies, and cannot achieve interaction experience close to natural language.

SUMMARY

According to example embodiments of the present disclosure, a voice interaction solution is provided.

In a first aspect of the present disclosure, a method for voice interaction is provided. The method includes: extracting an acoustic feature from received voice data, the acoustic feature indicating a short-term amplitude spectrum characteristic of the voice data; applying the acoustic feature to a type recognition model to determine an intention type of the voice data, the intention type being one of an interaction intention type and a non-interaction intention type, and the type recognition model being constructed based on acoustic feature of training voice data; and performing, based on determining that the intention type is the interaction intention type, an interaction operation indicated by the voice data.

In a second aspect of the present disclosure, an apparatus for voice interaction is provided. The apparatus includes: a feature extraction module, configured to extract an acoustic feature from received voice data, the acoustic feature indicating a short-term amplitude spectrum characteristic of the voice data; a type recognition module, configured to apply the acoustic feature to a type recognition model to determine an intention type of the voice data, the intention type being one of an interaction intention type and a non-interaction intention type, and the type recognition model being constructed based on acoustic feature of training voice data; and an interaction performing module, configured to perform an interaction operation indicated by the voice data, based on determining that the intention type is the interaction intention type.

In a third aspect of the present disclosure, an electronic device is provided, the electronic device includes: one or more processors; and a storage apparatus, for storing one or more programs, the one or more programs, when executed by the one or more processors, cause the electronic device to implement the method according to the first aspect.

In a fourth aspect of the present disclosure, a computer readable storage medium is provided, the computer readable storage medium stores a computer program thereon, the program, when executed by a processor, cause the method according to the first aspect to be implemented.

It should be understood that the content described in the summary part is not intended to limit key or important features of embodiments of the present disclosure, nor is it intended to limit the scope of the present disclosure. Other features of the present disclosure may become easier to understand through the following description.

BRIEF DESCRIPTION OF THE DRAWINGS

The above and other features, advantages, and aspects of the embodiments of the present disclosure will become more apparent in conjunction with the accompanying drawings and with reference to the following detailed description. In the accompanying drawings, same or similar reference numerals indicate the same or similar elements, in which.

DETAILED DESCRIPTION OF EMBODIMENTS

Hereinafter, embodiments of the present disclosure will be described in more detail with reference to the accompanying drawings. Although some embodiments of the present disclosure are shown in the drawings, it should be understood that the present disclosure can be implemented in various forms, and should not be construed as being limited to the embodiments set forth herein. The embodiments are provided for a more thorough and complete understanding of the present disclosure. It should be understood that the drawings and embodiments of the present disclosure are for illustrative purposes only, and are not intended to limit the protection scope of the present disclosure.

In the description of the embodiments of the present disclosure, the term "including" and similar language should be understood as an open inclusion, that is, "including but not limited to". The term "based on" should be understood as "at least partially based on." The term "one embodiment" or "the embodiment" should be understood as "to at least one embodiment". The terms "first", "second", etc. may refer to different or the same objects. The following may also include other explicit and implicit definitions.

As discussed above, with the development of artificial intelligence technology, interaction with smart devices has gradually entered daily lives. One is increasingly expecting to interact with smart devices in an interactive mode similar to using natural voice between people.

In a traditional voice interaction solution, a smart device is usually awakened by a specific wake-up word, and the smart device uses voice input after the wake-up word as a user's interaction instruction by default and performs an interaction operation. After performing this interaction, it returns to the operation of listening to the wake-up word. In other words, if the user needs to perform voice interaction with the smart device again at this time, the user has to use the wake-up word again to wake up the smart device. The disadvantage of this solution is that the interaction process of the smart device is one wake-up one interaction, the user needs to perform a wake-up operation using the wake-up word before each interaction, which is very cumbersome. Especially in scenarios where the user needs to perform a plurality of interactions in a short time (for example, the user needs to check the weather condition, set an alarm, and play music, etc.), the user experience may be very poor. In addition, this solution uses the voice input following the wake-up word as the user instruction by default, without recognizing the true intention of the input voice. When the user input is interrupted (such as the user's voice is covered by other environmental noise) or the device is accidentally awakened (such as the smart device mistakes surrounding environmental noise for the wake-up word and performs the wake-up operation), it may cause the human-computer interaction process to be executed incorrectly.

In another traditional solution for interacting with the device, it is proposed to implement multiple interactions with one wake-up by defining strategies and adding wake-up words, but the implementation effect of this solution depends on the rationality of the strategies and the accuracy of the wake-up words, the feasibility when implementing is not high and the effect is not ideal. At the same time, it still cannot solve the discrimination of the interaction intention of the user's voice input after false wake-up, and cannot achieve the effect of real natural interaction.

In addition, the traditional voice interaction solutions are mostly based on simple voice information such as tone, pause, and volume, or need to split the voice input into a plurality of words or phrases to recognize the semantics of the input voice. These voice recognition technologies cannot be make better use of the acoustic feature of the input voice, and the accuracy of voice recognition is not high.

According to an example embodiment of the present disclosure, a solution for voice interaction is proposed. In this solution, a complicated acoustic feature (such as the filter bank feature and/or the Mel frequency cepstrum coefficient feature) in the received voice data is extracted. The extracted acoustic feature may reflect the characteristic of the short-term amplitude spectrum of the voice from the perspective of the non-linear psychological perception of human ear to the frequency of sound, so that there is no need to analyze the input voice data word by word, nor to analyze the tone, pause or other features of the received voice data. Further, the extracted acoustic feature is applied to a type recognition model to determine an intention type of the voice data, where the type recognition model is also constructed based on the acoustic feature that may indicate the short-term amplitude spectrum characteristic of the voice data. Therefore, the type recognition model may realize voice recognition at whole sentence level. Based on a result output by the type recognition model, the intention type of the received voice data may be determined, that is, determining whether the type of the input voice data is an interaction intention type or a non-interaction intention type. Further, based on the type of the voice data, it is determined whether to trigger an interaction operation. In this way, the interaction operation no longer depends on a specific wake-up word, and multiple interactions with one wake-up is realized. In particular, for a scenario where the user needs to perform a plurality of interactions in a short time, a more natural interaction mode may be provided. In addition, the solution according to embodiments of the present disclosure includes, specifically, the operation of determining the intention type of the received voice data, so that even if the device is in a state of false wake-up, the received voice data may not be regarded as an execution instruction of the interaction operation by default, avoiding unnecessary interaction operation.

Figure 1:
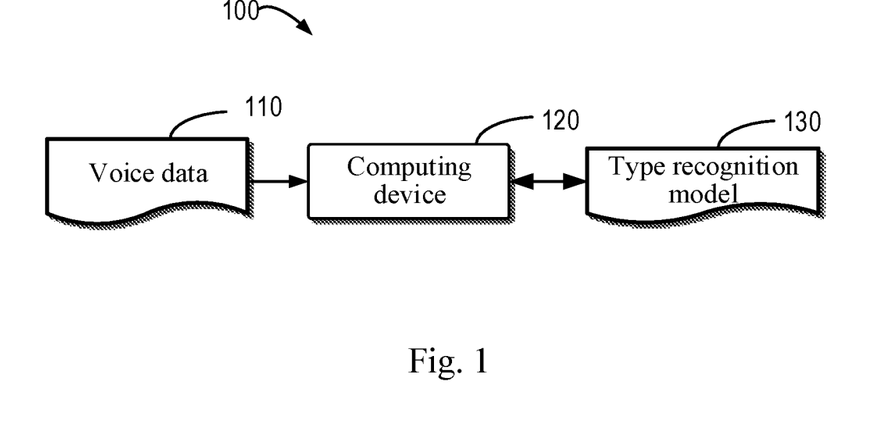
FIG. 1 shows a schematic diagram of an example environment of a voice interaction solution according to various embodiments of the present disclosure.

Hereinafter, embodiments of the present disclosure will be described in detail with reference to the accompanying drawings. FIG. 1 shows a schematic diagram of an example environment 100 in which various embodiments of the present disclosure can be implemented. In this example environment 100, a computing device 120 may receive voice data 110. In the embodiments of the present disclosure, the voice data 110 may refer to any received voice data. Illustrative but non-limiting examples of the voice data 110 may be: voice data from a user, voice data from a smart device, voice data obtained from other media resources, etc., which is not limited in the embodiments of present disclosure.

As shown in FIG. 1, after receiving the voice data 110, the computing device 120 may extract an acoustic feature of the voice data 110, and input the extracted acoustic feature into a type recognition model 130, determine an intention type of the voice data 110 based on a result returned by the type recognition model 130. Based on the intention type of the voice data 110, the received voice data 110 may be processed correctly. Specifically, when the voice data 110 is of the interaction intention type, the computing device 120 may perform an interaction operation indicated by the voice data 110. Alternatively, the computing device 120 may return an operation result of the interaction operation to the user.

Those skilled in the art should understand that, for illustration purpose only, the type recognition model 130 is shown as an independent block in FIG. 1. However, according to an embodiment of the present disclosure, the type recognition model 130 may also be stored in any storage space inside the computing device 120, or may be stored in any storage device accessible by the computing device 120, which is not limited in a specific implementation in the present disclosure.

Figure 2:
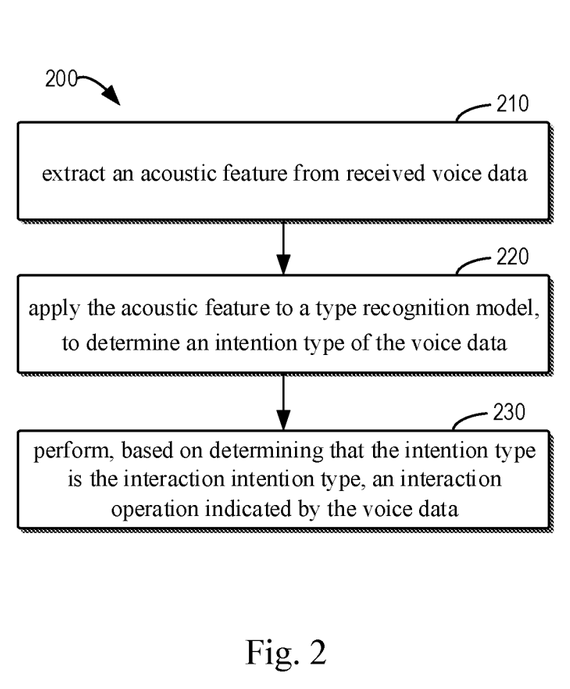
FIG. 2 shows a flowchart of a method for voice interaction according to some embodiments of the present disclosure.
Figure 3:
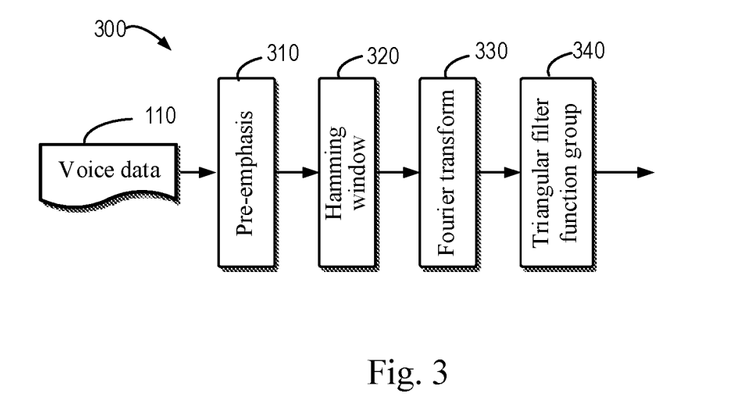
FIG. 3 shows a flowchart of a filter bank feature extraction process according to an embodiment of the present disclosure.

Hereinafter, a voice interaction process according to various embodiments of the present disclosure will be described in more detail with reference to FIGS. 2 to 4. FIG. 2 shows a flowchart of a processing process 200 of voice interaction according to some embodiments of the present disclosure. The process 200 may be implemented by the computing device 120 of FIG. 1. To facilitate discussion, the process 200 will be described in conjunction with FIG. 1.

At block 210, the computing device 120 extracts the acoustic feature in the received voice data 110. There may be many methods to obtain the voice data 110, and the specific implementation method is not limited in embodiments of the present disclosure. For example, in some embodiments, the computing device 120 may directly acquire, through an acquisition apparatus of its own, voice from the user or other devices. Additionally or alternatively, the computing device 120 may receive the voice data 110 via a network through a wireless or wired connection.

The inventor notes that in reality, when the difference between the frequencies of two tones is smaller than a critical bandwidth, people may hear the two tones as one. In addition, the inventor also notes that in the case of that the sound pressure is constant, when noise is limited to a certain bandwidth, the subjective loudness perceived by human ear is constant within this bandwidth, and the loudness of a signal with a complex envelope within this bandwidth is equivalent to the loudness of a pure tone at the center frequency position of this bandwidth, regardless of the frequency distribution of the signal itself. Based on the above feature of the voice data 110, according to some example embodiments of the present disclosure, the filter bank feature is used as the acoustic feature of the voice data 110.

The extraction process when the acoustic feature is the filter bank feature will now be described in detail with reference to FIG. 3. FIG. 3 shows a flowchart illustrating a filter bank feature extraction process 300 according to an embodiment of the present disclosure. The process 300 may be implemented by the computing device 120 of FIG. 1. For ease of discussion, the process 300 will be described in conjunction with FIG. 1.

At block 310, the computing device 120 performs pre-emphasis on the received voice data 110, that is, through a first-order finite excitation response high-pass filter, so that the frequency spectrum of the voice data 110 becomes flat and is not easily affected by the effect of word size limitation.

At a subsequent block 320, the computing device 120 windows the pre-emphasized data through the Hamming window. The Hamming window is a window function that has a non-zero value in a certain interval and is zero in the rest intervals. After windowed by the Hamming window, the influence of Gibbs effect is correspondingly reduced, and its output result is more suitable for performing Fourier transform.

At block 330, the computing device 120 performs a Fourier transform on the windowed data. This is because the transformation of the voice data 110 in the time domain is usually difficult to indicate the characteristic of the voice data 110. However, after the Fourier transform, the energy distribution of the voice data 110 in the frequency domain may be obtained, and the energy distribution in the frequency domain may well indicate the acoustic feature of the voice data 110.

At block 340, the Fourier transformed data is input to a triangular filter function group. The triangular filter function group may smooth the frequency spectrum and eliminate the effect of harmonics, to better highlight the formants of the voice data 110.

Through the above processing, the computing device 120 may obtain the acoustic feature (i.e., filter bank feature) of the voice data 110.

In an alternative embodiment, the computing device 120 may also extract the Mel frequency cepstrum coefficient feature in the voice data 110 as the acoustic feature of the voice data 110. Compared with the extraction process of the filter bank feature, a discrete cosine transform is added in the extraction process of the Mel frequency cepstrum coefficient feature. The discrete cosine transform may remove the correlation between parameters, making an output result have better recognition degree, but at the same time the amount of calculation is increased.

In this way, the acoustic feature of the voice data 110 may be obtained from the perspective of the non-linear psychological perception of human ear to the frequency of sound, reflecting the characteristic of the short-term amplitude spectrum of the voice data 110. Compared with extracting the feature such as tone, pause, volume, in the extracted voice data in the traditional solutions, the filter bank feature and the Mel frequency cepstrum coefficient feature may better reflect the acoustic characteristic of the voice data 110, without any splitting of the voice data 110, and realizing voice recognition at whole sentence level.

Those skilled in the art should understand that the filter bank feature and the Mel frequency cepstrum coefficient feature are only preferred embodiments and not the only implementation. In other embodiments, other acoustic features that may indicate the short-term amplitude spectrum characteristic of the voice data 110 may be used, which is not limited in the embodiments of the present disclosure.

The operation of the computing device 120 extracting the acoustic feature in the voice data 110 is discussed in detail above. With further reference and back to FIG. 2, at block 220, the computing device 120 applies the extracted acoustic feature to the type recognition model 130 to determine the intention type of the voice data 110, that is, to determine whether the intention type of the voice data 110 is an interaction intention type or a non-interaction intention type. The type recognition model 130 may be constructed based on the acoustic feature of training voice data. Similar to the acoustic feature, the acoustic feature of training voice data may also be an acoustic parameter indicating the short-term amplitude spectrum characteristic of the training voice data, such as the filter bank feature or the Mel frequency cepstrum coefficient feature discussed above.

In some example embodiments of the present disclosure, the type recognition model 130 is constructed with determining whether the voice data 110 corresponding to the input acoustic feature has an interaction intention as training target. In this way, there is no need to split the voice data 110, and there is no need to recognize features such as tone, or pause in the voice data 110, and the judgment of the intention type of the voice data 110 is realized at the whole sentence level.

In some example embodiments of the present disclosure, the type recognition model 130 may be a convolution long short-term memory deep neural network CLDNN model. Referring now to FIG. 4, an exemplary CLDNN model according to an embodiment of the present disclosure is described.

Figure 4:
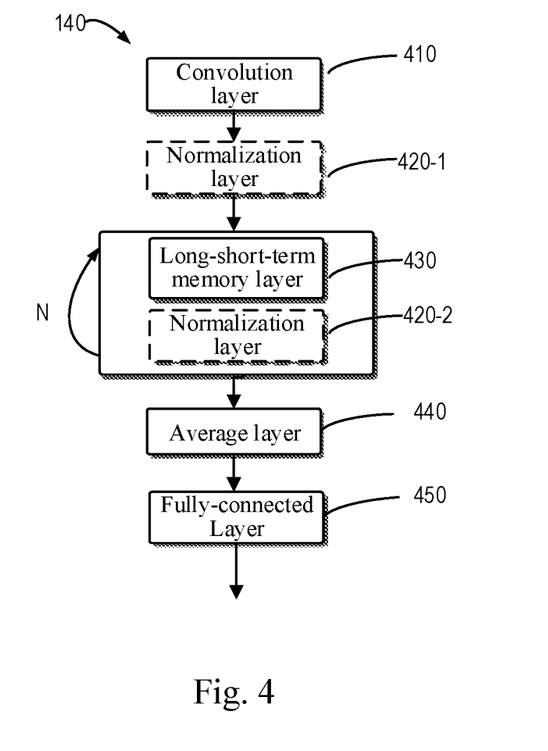
FIG. 4 shows a schematic block diagram of a type recognition model capable of implementing various embodiments of the present disclosure.

As shown in FIG. 4, the type recognition model 130 includes a convolution layer 410, a normalization layer 420-1, a long-short-term memory layer 430, a normalization layer 420-2, an average layer 440, and a fully-connected Layer 450 connected in sequence, where the normalization layer 420-1 and the normalization layer 420-2 are optional. Further, as shown in FIG. 4, the long-short-term memory layer 430 and the normalization layer 420-2 may be N connected in series, and N is an integer greater than 1.

As shown in FIG. 4, in some example embodiments of the present disclosure, the convolutional long short-term memory deep neural network CLDNN model further includes the average layer 440 before the fully-connected layer 450. The average layer 440 may make data streams of different lengths have the same length after passing through the average layer 440. Therefore, different voice data 110 usually have different lengths in the time domain, and the average layer 440 may make the voice data 110 have the same length in the time domain. The acoustic features of different voice data 110 may be better reflected.

With further reference and back to FIG. 2, at block 230, when the computing device 120 determines that the intention type of the voice data 110 is the interaction type, an interaction operation is performed. Specifically, the computing device 120 obtains semantic information of the voice data 110, and further determines the interaction operation corresponding to the semantic information and executes the interaction process. Those skilled in the art should understand that there may be a plurality of methods for acquiring the semantic information of the voice data 110, determining the interaction operation corresponding to the semantic information, and how to performing the interaction process, which is not limited in the embodiments of the present disclosure.

In some example embodiments of the present disclosure, the computing device 120 executes the process 200 only for a period of time after being woken up. Those skilled in the art should understand that the computing device 120 may be awakened using various methods, including but not limited to, by using a wake-up word, a specific touch/hover operation, triggering a specific application, or based on a pre-defined wake-up strategy (such as specific time, place or other triggering conditions), etc. After receiving a wake-up instruction, the computing device 120 starts a listening timer to receive the voice data 110, and when the listening timer times out, stops receiving the voice data 110. In this way, the privacy of the user may be well protected, and the power consumption of the computing device 120 may be reduced.

As discussed above, the type recognition model 130 is constructed based on the acoustic feature of the training voice data 510. Those skilled in the art should understand that the construction of the type recognition model 130 and the use of the type recognition model 130 are two operations that are performed independently from each other. The construction of the type recognition model 130 will now be described in detail with reference to FIG. 5.

Figure 5:
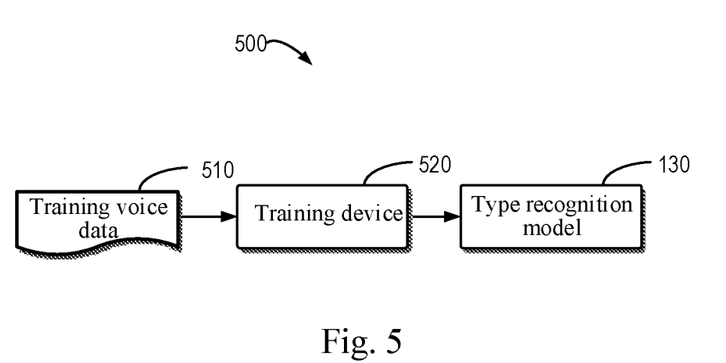
FIG. 5 shows a schematic diagram of an example environment of a solution for constructing a type recognition model according to various embodiments of the present disclosure.

FIG. 5 shows an example environment 500 of a solution for constructing a type recognition mode according to various embodiments of the present disclosure. As shown in FIG. 5, a training device 520 acquires training voice data 510, and uses the training voice data 510 to construct the type recognition model 130. Those skilled in the art should understand that the training device 520 and the computing device 120 shown in FIG. 1 may be the same device, or two different independent devices.

First, the training device 520 acquires the training voice data 510. Those skilled in the art should understand that there may be many ways to acquire the training voice data 510. According to some embodiments of the present disclosure, the training voice data 510 may be obtained from other voice recognition platforms. These voice platforms have accumulated massive amounts of voice recognition data, including both clearly pronounced data, as well as some noise/background sound/environmental noise or semantically unclear data. The voice recognition platforms may also provide information on whether the semantics of the data are correctly recognized. In this way, a large amount of training voice data 510 may be obtained, thereby ensuring that a sufficient amount of training voice data 510 may be obtained.

Alternatively or additionally, the training voice data 510 may also be manually generated, or from historical interaction instructions and the like. This type of data includes both data with a clear interaction intention and data with a clear non-interaction intention. For example, "What time is it?" may be regarded as data with a clear interaction intention, while "I am going to work" may be regarded as data with a clear non-interaction intention. In this way, this type of data has higher accuracy in constructing the type recognition model, and plays a key role in constructing a high-accuracy type recognition model 130.

Alternatively or additionally, the training voice data 510 may also include data related to the result of the interaction operation. This type of data includes both data indicating that the interaction operation indicated by the data is correctly performed, and data indicating the execution of the interaction operation indicated by the data is interrupted. For example, the data "What time is it?" is usually executed correctly by a smart device and an interaction result is returned, but "Please help me to bring the book on the table" may be interrupted during execution. Some platforms or institutions may provide this type of data and results of whether the interaction operations indicated by this type of data are correctly performed, or the above information may be obtained by analyzing or counting historical execution information of the data.

Those skilled in the art should understand that in other embodiments, the training voice data 510 may also be obtained by using other acquisition methods, which is not limited in the embodiments of the present disclosure. Those skilled in the art should also understand that the acquired training voice data 510 may be stored in any storage space that the training device 520 can access. In addition, the training device 520 may also acquire the training voice data 510 via a network through a wired/wireless connection, which is not limited in the embodiments of the present disclosure.

As discussed above, after the training voice data 510 are acquired, the type recognition model 130 is constructed with determining whether the voice data 110 corresponding to the input acoustic feature has an interaction intention as training target. Therefore, the training voice data 510 need to be labeled as positive training voice data indicating an interaction intention or negative training voice data indicating a non-interaction intention.

According to some example embodiments of the present disclosure, the training voice data 510 may be labeled based on whether the semantics of the training voice data have been correctly recognized. Specifically, the correctly recognized training voice data 510 are labeled as positive training voice data, and the not correctly recognized training voice data 510 are labeled as negative training voice data.

Alternatively or additionally, according to some example embodiments of the present disclosure, the training voice data 510 may be labeled based on whether the training voice data 510 has the interaction intention. Specifically, the training voice data 510 having the interaction intention are labeled as positive training voice data, and the training voice data 510 having the non-interaction intention are labeled as negative training voice data.

Alternatively or additionally, according to some example embodiments of the present disclosure, the training voice data 510 may also be labeled based on whether the interaction operation indicated by the training voice data 510 is correctly performed. Specifically, the training voice data 510 in which the interaction operation indicated by the training voice data 510 is correctly performed is labeled as positive training voice data, and the training voice data 510 in which the interaction operation indicated by the training voice data is not correctly performed is labeled as negative training voice data.

Those skilled in the art should understand that the above labeling methods are only shown as examples. According to the source of the training voice data 510/the influence (positive/negative) to the intention type, in other embodiments, other labeling methods may also be used, which is not limited in the embodiments of the present disclosure.

In this way, according to some example embodiments of the present disclosure, when constructing the type recognition model 130, the training voice data 510 applied to the type recognition model 130 are labeled as positive training voice data indicating an interaction intention or negative training voice data indicating a non-interaction intention. For example, the training voice data may be labeled based on whether the semantics of the training voice data 510 have been correctly recognized, whether the training voice data 510 have the interaction intention, or whether the interaction operation indicated by the training voice data 510 is correctly performed. In this way, the source of the training voice data 510 is more flexible and diverse, making the trained type recognition model more accurate.

The training device 520 may use the labeled training voice data 510 to construct the type recognition model 130. According to some example embodiments of the present disclosure, the training device 520 may sequentially use the training voice data 510 to construct the type recognition model 130 based on the accuracy of the training voice data 510 in constructing the type recognition model. Specifically, the training device 520 determines a first part of training voice data and a second part of training voice data from the training voice data 510, where the second part of training voice data has a higher accuracy in constructing the type recognition model than the first part of training voice data. The training device 520 first use the acoustic feature of the first part of training voice data to construct a basic model. Then, the training device 520 updates the basic model using the acoustic feature of the second part of training voice data to obtain the type recognition model 130. The extraction process of the acoustic feature is similar to the above described extraction process of the acoustic feature, and for the sake of brevity, it will be omitted herein.

An illustrative but non-limiting example includes: first a basic model is constructed by using the training voice data 510 labeled based on whether the semantics of the training voice data 510 have been correctly recognized and whether the interaction operation indicated by the training voice data 510 is correctly performed, and then the basic model is updated by using the training voice data 510 labeled based on whether the training voice data 510 has an interaction intention, to obtain the type recognition model 130.

Those skilled in the art should understand that the above example is for illustration only and is not intended to limit the present disclosure. The operation of constructing the type recognition model 130 may be performed by being divided into more phases (i.e., constructing a plurality of basic models). For example, first, a first basic model is constructed by using the first part of training voice data, then the second part of training voice data is used to update the first basic model to construct a second basic model, and the $N^{th}$ part of training voice data is used to update the $N-1^{th}$ basic model to construct the type recognition model, where N is an integer greater than 2.

Compared with the traditional construction method that does not make any distinction between the training voice data 520, through the solution of the present disclosure, the training voice data 510 having higher accuracy in constructing the type recognition model are used to optimize the type recognition model 130, so that the accuracy of the constructed type recognition model 130 is higher.

Alternatively or additionally, the training device 520 may also expand the training voice data 510 based on the accuracy of the training voice data 510 in constructing the type recognition model, and use the acoustic feature of the expanded training voice data to construct the type recognition model 130. Specifically, the training device 520 determines the first part of training voice data and the second part of training voice data from the training voice data 510, where the second part of training voice data has a higher accuracy in constructing the type recognition model than the first part of training voice data. Then, the training device 520 expands the training voice data by increasing the number of the second part of training voice data. Then, the training device 520 uses the acoustic feature of the expanded training voice data to construct the type recognition model 130. The extraction process of the acoustic feature is similar to the above described extraction process of the acoustic feature, and for the sake of brevity, it will be omitted herein.

An illustrative but non-limiting example includes that the training device 520 first increases the number of the training voice data 510 based on whether the training voice data 510 has an interaction intention, to expand the training voice data 510, and then uses the acoustic feature of the expanded training voice data to construct the type recognition model 130.

There may be many approaches to increase the number of the second part of training voice data. In some example embodiments of the present disclosure, the second part of training voice data may be copied in its entirety a plurality of times. Alternatively or additionally, the training voice data in the second part of training voice data may be copied in different proportions. In other embodiments, the number of the second part of training voice data may also be increased by adopting any other method, which is not limited in the embodiments of the present disclosure.

Those skilled in the art should also understand that the above solutions for constructing the type recognition model 130 may be combined with each other. For example, the training voice data 510 may be first expanded based on the accuracy of the training voice data 510 in constructing the type recognition model, and then based on the accuracy of the expanded training voice data in constructing the type recognition model, a plurality of basic models are constructed using the expanded training voice data, and finally the type recognition model 130 is constructed.

In this way, the training device 520 takes into account the difference in the accuracy of the training voice data 510 in constructing the type recognition model 130, so that the ratio of the training voice data having higher accuracy in constructing the type recognition models in all training voice data 510 is increased, thereby increasing the accuracy of the constructed type recognition model 130.

Figure 6:
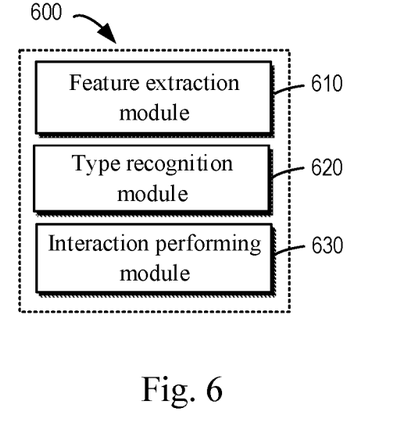
FIG. 6 shows a schematic block diagram of an apparatus for voice interaction capable of implementing various embodiments of the present disclosure.

FIG. 6 shows a schematic block diagram of an apparatus 600 for voice interaction according to an embodiment of the present disclosure. The apparatus 600 is included in the computing device 120 of FIG. 1. The apparatus 600 includes: a feature extraction module 610, configured to extract an acoustic feature from received voice data 110, the acoustic feature indicating a short-term amplitude spectrum characteristic of the voice data 110; a type recognition module 620, configured to apply the acoustic feature to a type recognition model 130 to determine an intention type of the voice data 110, the intention type being one of an interaction intention type and a non-interaction intention type, and the type recognition model 130 being constructed based on the acoustic feature of training voice data 510; and an interaction performing module 630, configured to perform an interaction operation indicated by the voice data 110, based on determining that the intention type is the interaction intention type.

According to some example embodiments of the present disclosure, the apparatus 600 further includes: a labeling module, configured to label the training voice data 510, the labeled training voice data being positive training voice data indicating an interaction intention or negative training voice data indicating a non-interaction intention; and a first type recognition model construction module, configured to construct the type recognition model by using the labeled training voice data.

According to some example embodiments of the present disclosure, the labeling module further includes: a positive training voice data labeling module, configured to label the training voice data 510 as the positive training voice data, based on determining at least one of: semantics of the training voice data 510 is correctly recognized; the training voice data 510 has the interaction intention; or the interaction operation indicated by the training voice data 510 is correctly performed.

According to some example embodiments of the present disclosure, the labeling module further includes: a negative training voice data labeling module, configured to label the training voice data 510 as the negative training voice data, based on determining at least one of: semantics of the training voice data 510 is not correctly recognized; the training voice data 510 has the non-interaction intention; or the interaction operation indicated by the training voice data 510 is not correctly performed.

According to some example embodiments of the present disclosure, the apparatus 600 further includes a first training data recognition module, configured to determine, from the training voice data, a first part of training voice data and a second part of training voice data, where the second part of training voice data has a higher accuracy in constructing the type recognition model 130 than the first part of training voice data; a basic model construction module, configured to construct a basic model by using acoustic feature of the first part of the training voice data; and a second type recognition model construction module, configured to update the basic model by using the acoustic feature of the second part of training voice data, to obtain the type recognition model 130.

According to some example embodiments of the present disclosure, the apparatus 600 further includes a second training data recognition module, configured to determine, from the training voice data, a first part of training voice data and a second part of training voice data, wherein the second part of training voice data has a higher accuracy in constructing the type recognition model 130 than the first part of training voice data; a training voice data expanding module, configured to expand the training voice data 510 by increasing the number of the second part of training voice data; and a third type recognition model construction module, configured to construct the type recognition model 130 by using the acoustic feature of expanded training voice data 510.

According to some example embodiments of the present disclosure, the apparatus 600 further includes a timer starting module, configured to start a listening timer to receive the voice data 110, based on determining that a wake-up instruction is received; and a timer listening module, configured to stop receiving the voice data 110, based on determining that the listening timer times out.

According to some example embodiments of the present disclosure, the type recognition model 130 is a convolutional long short-term memory deep neural network CLDNN model, the CLDNN model at least includes an average layer, and data streams of different lengths have a same length after being processed by the average layer.

According to some example embodiments of the present disclosure, the acoustic feature includes at least one of: a filter bank feature or a Mel frequency cepstrum coefficient feature.

Figure 7:
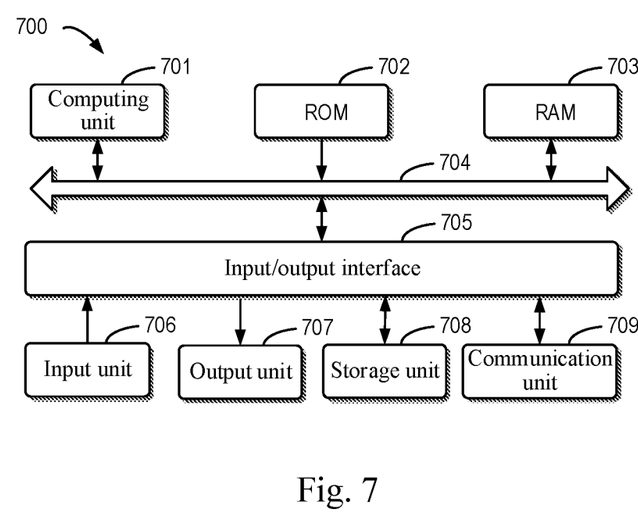
FIG. 7 shows a schematic block diagram of a computing device capable of implementing various embodiments of the present disclosure.

FIG. 7 shows a schematic block diagram of an exemplary device 700 capable of implementing various embodiments of the present disclosure. The device 700 may be used to implement the device 120 shown in FIG. 1 and the training device 520 shown in FIG. 5. As shown in the figure, the device 700 includes a computing unit 701 that may perform various appropriate actions and processing in accordance with computer program instructions stored in a read only memory (ROM) 702 or computer program instructions loaded into a random access memory (RAM) 703 from a storage unit 708. In the RAM 703, various programs and data required for the operation of the device 700 may also be stored. The computing device 701, the ROM 702, and the RAM 703 are connected to each other through a bus 704. An input/output (I/O) interface 705 is also coupled to the bus 704.

A plurality of components in the device 700 are coupled to the I/O interface 705, including: an input unit 706, such as a keyboard or a mouse; an output unit 707, such as various types of displays, or speakers; the storage unit 708, such as a disk or an optical disk; and a communication unit 709 such as a network card, a modem, or a wireless communication transceiver. The communication unit 709 allows the device 700 to exchange information/data with other devices over a computer network such as the Internet and/or various telecommunication networks.

The computing unit 701 may be various general-purpose and/or dedicated processing components having processing and computing capabilities. Some examples of the computing unit 701 include, but are not limited to, central processing unit (CPU), graphics processing unit (GPU), various dedicated artificial intelligence (AI) computing chips, various computing units running machine learning model algorithms, digital signal processor (DSP), and any suitable processor, controller, microcontroller, etc. The computing unit 701 performs various methods and processes described above, such as the process 200. For example, in some embodiments, the process 200 may be implemented as a computer software program, which is tangibly contained on a machine-readable medium, such as the storage unit 708. In some embodiments, part or all of the computer program may be loaded and/or installed on the device 700 via the ROM 702 and/or the communication unit 709. When the computer program is loaded into the RAM 703 and executed by the computing unit 701, one or more steps of the process 200 described above may be performed. Alternatively, in other embodiments, the computing unit 701 may be configured to perform the process 200 by any other suitable means (e.g., by means of firmware).

The functions described herein above may be performed at least in part by one or more hardware logic components. For example, without limitation, exemplary types of hardware logic components that may be used include: field programmable gate array (FPGA), application specific integrated circuit (ASIC), application specific standard product (ASSP), system on chip system (SOC), load programmable logic device (CPLD), etc.

Program codes for implementing the method of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various operations are described in a specific order, this should not be understood that such operation are required to be performed in the specific order shown or in sequential order, or all illustrated operations should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although the embodiments of the present disclosure are described in language specific to structural features and/or method logic actions, it should be understood that the subject matter defined in the appended claims is not limited to the specific features or actions described above. Instead, the specific features and actions described above are merely exemplary forms of implementing the claims.

What is claimed is:

1. A method for voice interaction, the method comprising:
   determining, from training voice data by a training device that acquires the training voice data via a computer network, a first part of training voice data and a second part of training voice data, wherein the second part of training voice data has a higher accuracy in constructing the type recognition model than the first part of training voice data; and
   obtaining a type recognition model by using acoustic features of the first part of training voice data and the second part of training voice data, the acoustic features including features indicating a short-term amplitude spectrum characteristic of the training voice data;
   automatically extracting an acoustic feature from received voice data, the acoustic feature indicating a short-term amplitude spectrum characteristic of the voice data;
   applying the acoustic feature to the type recognition model to determine an intention type of the voice data, the intention type being one of an interaction intention type and a non-interaction intention type; and
   performing, based on determining that the intention type is the interaction intention type, an interaction operation indicated by the voice data, the interaction operation including a process of human-computer interaction.

2. The method according to claim 1, further comprising:
   labeling the training voice data, the labeled training voice data being positive training voice data indicating an interaction intention or negative training voice data indicating a non-interaction intention; and
   constructing the type recognition model by using the labeled training voice data.

3. The method according to claim 2, wherein the labeling the training voice data comprises:
   labeling the training voice data as the positive training voice data, based on determining at least one of:
   semantics of the training voice data is correctly recognized;
   the training voice data has the interaction intention; or
   the interaction operation indicated by the training voice data is correctly performed.

4. The method according to claim 2, wherein the labeling the training voice data comprises:
   labeling the training voice data as the negative training voice data, based on determining at least one of:
   semantics of the training voice data is not correctly recognized;
   the training voice data has the non-interaction intention; or
   the interaction operation indicated by the training voice data is not correctly performed.

5. The method according to claim 1, wherein the obtaining comprises:
   constructing a basic model by using acoustic feature of the first part of training voice data; and
   updating the basic model by using acoustic feature of the second part of training voice data, to obtain the type recognition model.

6. The method according to claim 1, wherein the obtaining comprises:
   expanding the training voice data by increasing a number of the second part of training voice data; and
   constructing the type recognition model by using acoustic feature of the expanded training voice data.

7. The method according to claim 1, further comprising:
   starting a listening timer to receive the voice data, based on determining that a wake-up instruction is received; and
   stopping receiving the voice data, based on determining that the listening timer times out.

8. The method according to claim 1, wherein the type recognition model is a convolutional long short-term memory deep neural network CLDNN model, the CLDNN model at least comprises an average layer, and data streams of different lengths have a same length after being processed by the average layer.

9. The method according to claim 1, wherein the acoustic feature comprises at least one of: a filter bank feature or a Mel frequency cepstrum coefficient feature.

10. An apparatus for voice interaction, the apparatus comprising:
  at least one processor; and
  a memory storing instructions, the instructions when executed by the at least one processor, cause the at least one processor to perform operations, the operations comprising:
    determining, from training voice data by a training device that acquires the training voice data via a computer network, a first part of training voice data and a second part of training voice data, wherein the second part of training voice data has a higher accuracy in constructing the type recognition model than the first part of training voice data; and
    obtaining a type recognition model by using acoustic features of the first part of training voice data and the second part of training voice data, the acoustic features including features indicating a short-term amplitude spectrum characteristic of the training voice data;
    automatically extracting an acoustic feature from received voice data, the acoustic feature indicating a short-term amplitude spectrum characteristic of the voice data;
    applying the acoustic feature to the type recognition model to determine an intention type of the voice data, the intention type being one of an interaction intention type and a non-interaction intention type; and
    performing, based on determining that the intention type is the interaction intention type, an interaction operation indicated by the voice data, the interaction operation including a process of human-computer interaction.

11. The apparatus according to claim 10, wherein the operations further comprise:
  labeling the training voice data, the labeled training voice data being positive training voice data indicating an interaction intention or negative training voice data indicating a non-interaction intention; and
  constructing the type recognition model by using the labeled training voice data.

12. The apparatus according to claim 11, wherein the labeling the training voice data comprises:
  labeling the training voice data as the positive training voice data, based on determining at least one of:
  semantics of the training voice data is correctly recognized;
  the training voice data has the interaction intention; or
  the interaction operation indicated by the training voice data is correctly performed.

13. The apparatus according to claim 11, wherein the labeling the training voice data comprises:
  labeling the training voice data as the negative training voice data, based on determining at least one of:
  semantics of the training voice data is not correctly recognized;
  the training voice data has the non-interaction intention; or
  the interaction operation indicated by the training voice data is not correctly performed.

14. The apparatus according to claim 10, wherein the obtaining comprises:
  constructing a basic model by using acoustic feature of the first part of training voice data; and
  updating the basic model by using acoustic feature of the second part of training voice data, to obtain the type recognition model.

15. The apparatus according to claim 10, wherein the obtaining comprises:
  expanding the training voice data by increasing a number of the second part of training voice data; and
  constructing the type recognition model by using acoustic feature of the expanded training voice data.

16. The apparatus according to claim 10, wherein the operations further comprise:
  starting a listening timer to receive the voice data, based on determining that a wake-up instruction is received; and
  stopping receiving the voice data, based on determining that the listening timer times out.

17. The apparatus according to claim 10, wherein the type recognition model is a convolutional long short-term memory deep neural network CLDNN model, the CLDNN model at least comprises an average layer, and data streams of different lengths have a same length after being processed by the average layer.

18. The apparatus according to claim 10, wherein the acoustic feature comprises at least one of: a filter bank feature or a Mel frequency cepstrum coefficient feature.

19. A non-transitory computer readable storage medium, storing a computer program thereon, wherein the computer program, when executed by a processor, cause the process to implement operations, the operations comprise:
  determining, from training voice data by a training device that acquires the training voice data via a computer network, a first part of training voice data and a second part of training voice data, wherein the second part of training voice data has a higher accuracy in constructing the type recognition model than the first part of training voice data; and
  obtaining a type recognition model by using acoustic features of the first part of training voice data and the second part of training voice data, the acoustic features including features indicating a short-term amplitude spectrum characteristic of the training voice data;
  automatically extracting an acoustic feature from received voice data, the acoustic feature indicating a short-term amplitude spectrum characteristic of the voice data;
  applying the acoustic feature to the type recognition model to determine an intention type of the voice data, the intention type being one of an interaction intention type and a non-interaction intention type; and
  performing, based on determining that the intention type is the interaction intention type, an interaction operation indicated by the voice data, the interaction operation including a process of human-computer interaction.

20. The medium according to claim 19, wherein the operations further comprise:
  labeling the training voice data, the labeled training voice data being positive training voice data indicating an interaction intention or negative training voice data indicating a non-interaction intention; and
  constructing the type recognition model by using the labeled training voice data.

* * * * *